(12) United States Patent
Hizaki et al.

(10) Patent No.: US 10,152,835 B2
(45) Date of Patent: Dec. 11, 2018

(54) VEHICLE CONTROL DEVICE

(71) Applicant: TOYOTA JIDOSHA KABUSHIKI KAISHA, Toyota-shi, Aichi-ken (JP)

(72) Inventors: Masaya Hizaki, Nagareyama (JP); Takuji Yamada, Musashino (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/809,563

(22) Filed: Nov. 10, 2017

(65) Prior Publication Data
US 2018/0158262 A1 Jun. 7, 2018

(30) Foreign Application Priority Data
Dec. 5, 2016 (JP) .................. 2016-235816

(51) Int. Cl.
*B60Q 1/00* (2006.01)
*G07C 5/08* (2006.01)
*B60Q 9/00* (2006.01)
*G01C 21/36* (2006.01)

(52) U.S. Cl.
CPC ............. *G07C 5/0825* (2013.01); *B60Q 9/00* (2013.01); *G01C 21/3697* (2013.01)

(58) Field of Classification Search
CPC ........... G08G 1/00; G08G 1/16; G01C 21/26; G01C 21/36; B60R 16/02
USPC ...... 340/457, 995.1, 995.13, 995.17, 995.19, 340/995.24; 701/23, 117
See application file for complete search history.

(56) References Cited

U.S. PATENT DOCUMENTS

| | | | | |
|---|---|---|---|---|
| 7,149,625 | B2 * | 12/2006 | Mathews | G01C 21/26 701/420 |
| 8,188,887 | B2 * | 5/2012 | Catten | G06F 17/30241 340/425.5 |
| 9,688,288 | B1 * | 6/2017 | Lathrop | B60W 50/14 |
| 2005/0096839 | A1 * | 5/2005 | Nakano | G01C 21/3694 701/532 |
| 2009/0112463 | A1 * | 4/2009 | Yamane | G01C 21/3469 701/533 |

FOREIGN PATENT DOCUMENTS

JP 2015-207253 A 11/2015

* cited by examiner

*Primary Examiner* — Toan N Pham
(74) *Attorney, Agent, or Firm* — Hunton Andrews Kurth LLP (57) ABSTRACT

A vehicle control device that is applied to a vehicle including a driving support device that executes driving support based on an instruction for use or nonuse of a user includes an electronic control unit, the electronic control unit is configured to execute a destination information acquisition process, a path information acquisition process of acquiring path information, a section setting process of setting a notification available section, an operation information acquisition process of acquiring information on the presence or absence of a user operation, and a notification process of performing a notification to request the user to operate an information providing device and use the driving support device.

12 Claims, 4 Drawing Sheets

VEHICLE CONTROL DEVICE

INCORPORATION BY REFERENCE

The disclosure of Japanese Patent Application No. 2016-235816 filed on Dec. 5, 2016 including the specification, drawings and abstract is incorporated herein by reference in its entirety.

BACKGROUND

1. Technical Field

The present disclosure relates to a vehicle control device that is applied to a vehicle including a driving support device that executes driving support based on an instruction for use or nonuse of a user.

2. Description of Related Art

For example, Japanese Unexamined Patent Application Publication No. 2015-207253 (JP 2015-207253 A) describes a vehicle on which a driving support device that maintains a set speed while maintaining an inter-vehicle distance from a forward vehicle is mounted. A device that performs report (notification) to request a user to use the driving support device when a frequency of use of the driving support device is smaller than a set value is mounted on the vehicle.

SUMMARY

Incidentally, a driving load is high, for example, when a user is trying to change a lane. Accordingly, when a notification to request the user to use the driving support device using the device, the notification is likely to annoy the user.

The present disclosure provides a vehicle control device that can request a user to use a driving support device at a timing that is easy for a user to accept the request.

An aspect of the present disclosure relates to a vehicle control device that is applied to a vehicle including a driving support device configured to execute driving support based on an instruction for use or nonuse of a user, the vehicle control device including an electronic control unit. The electronic control unit is configured to execute a destination information acquisition process of acquiring information on a destination of the vehicle, a path information acquisition process of acquiring path information that is information on a path from a current position of the vehicle to the destination, a section setting process of setting a section on the path from the current position of the vehicle to the destination as a notification available section on condition that a driving load in the section is not equal to or higher than a predetermined level based on the path information, an operation information acquisition process of acquiring information on the presence or absence of a user operation of an accessory device that is an electronic device other than a powertrain system and a chassis system of the vehicle, and a notification process of performing a notification to request the user to operate an information providing device that provides information and use the driving support device on condition that a logical product of the vehicle entering the notification available section and the user not operating the accessory device is true when the user does not instruct to use the driving support device.

In the vehicle control device according to the aspect, a notification is performed to request the user to use the driving support device on condition that the vehicle enters the notification available section. Since the notification available section is a section in which the driving load is determined to be smaller than the predetermined level based on the path information, the user is less likely to feel annoying to the notification. However, even when the vehicle is traveling in the notification available section, the user is likely to feel annoying to the notification in a case where the notification is performed when the user operates the accessory device. Therefore, in the aspect of the present disclosure, the notification for requesting the user to use the driving support device is performed on condition that the user does not operate the accessory device. Thus, it is possible to request the user to use the driving support device at a timing at which it is easy for the user to accept the request.

In the vehicle control device according to the aspect of the present disclosure, an execution period of the path information acquisition process and the section setting process may be longer than the execution period of the operation information acquisition process. Generally, shortening the execution period of the path information acquisition process due to, for example, the fact that a calculation load of the process of handling the path information used to recognize the driving load is higher than a calculation load of the operation information acquisition process tends to impose a high demand on calculation capability of a device that handles the path information. On the other hand, the path information used to recognize the driving load has a smaller changing speed than the operation information. Therefore, in the aspect of the present disclosure, it is possible to acquire the latest information as much as possible while suppressing an increase in the calculation load by causing the execution period of the path information acquisition process and the section setting process to be longer than the execution period of the operation information acquisition process.

In the vehicle control device according to the aspect of the present disclosure, the path information may include information on at least one of merging and branching of a lane. The electronic control unit may be configured to set a section that includes neither the merging nor the branching as the notification available section in the section setting process.

When there is merging of lanes, it is needed to perform driving while paying attention to a vehicle entering the lane in which the vehicle of the user is traveling from another lane. Accordingly, the driving load becomes at a high level as compared with a case where there is no merging of lanes. Further, when there is branching of the lane, the user drives while paying attention to changing the lane of a vehicle leaving the lane in which the vehicle of the user is traveling, or drives such that the vehicle of the user itself changes the lane. Accordingly, the driving load becomes at a high level as compared with a case where there is no branching of lanes. In the vehicle control device according to the aspect, the section in which the driving load is equal to or higher than a predetermined level is specified.

In the vehicle control device according to the aspect of the present disclosure, the electronic control unit may be configured to regard the driving load to be equal to or higher than the predetermined level by the vehicle reaching the at least one of the merging and the branching, and set a section within a predetermined distance from a portion in which there is the at least one of the merging and the branching as a notification prohibition section that is a section in which the notification process is prohibited in the section setting process.

In the vehicle control device according to the aspect of the present disclosure, the path information may include information on a section of at least one of a road having a gradient equal to or greater than a predetermined value and a road having a curve with a curvature equal to or greater than a predetermined value. The electronic control unit may be configured to set a section that does has neither road having the gradient equal to or greater than the predetermined value nor the road having the curve with the curvature equal to or greater than the predetermined value as the notification available section in the section setting process.

The driving load becomes at a high level when the vehicle travels on a road having a relatively great gradient as compared with a case where the vehicle travels on a flat road. Further, the driving load becomes at a high level when the vehicle travels on a road having a sharp curve as compared with a case where the vehicle travels straight. In the vehicle control device according to the aspect, the section in which the driving load is equal to or higher than a predetermined level is specified.

In the vehicle control device according to the aspect of the present disclosure, the electronic control unit may be configured to regard the driving load to be equal to or higher than the predetermined level by the vehicle traveling on the at least one of the road having the gradient equal to or greater than the predetermined value and the road having the curve with the curvature equal to or greater than the predetermined value, and set a section that has the at least one of the road having the gradient equal to or greater than the predetermined value and the road having the curve with the curvature equal to or greater than the predetermined value as a notification prohibition section that is a section in which the notification process is prohibited in the section setting process.

In the vehicle control device according to the aspect of the present disclosure, the path information may include information on a section in which the amount of rain is equal to or larger than a predetermined amount, and the electronic control unit may be configured to set a section in which the amount of rain is not equal to or larger than the predetermined amount as the notification available section in the section setting process.

The driving load becomes at a high level, for example, since visibility is poorer than that in a section in which the amount of rain is small when the vehicle travels in the section in which the amount of rain is equal to or larger than a predetermined amount. In the vehicle control device according to the aspect, the section in which the driving load is equal to or higher than a predetermined level is specified.

In the vehicle control device according to the aspect of the present disclosure, the electronic control unit may be configured to regard the driving load to be equal to or higher than the predetermined level by the vehicle traveling in the section in which the amount of rain is equal to or larger than the predetermined amount, and set the section in which the amount of rain is equal to or larger than the predetermined amount as a notification prohibition section that is a section in which the notification process is prohibited in the section setting process.

In the vehicle control device according to the aspect of the present disclosure, the path information may include information on at least one of a section with lane regulation and a section with traffic regulation. The electronic control unit may be configured to set a section that has neither the section with lane regulation nor the section with traffic regulation as the notification available section in the section setting process.

The driving load becomes at a high level since the user tends to drive by paying attention to behavior of a forward vehicle in the section with the lane regulation or the traffic regulation as compared with a section without the lane regulation or the traffic regulation. In the vehicle control device according to the aspect, the section in which the driving load is equal to or higher than a predetermined level is specified.

In the vehicle control device according to the aspect of the present disclosure, the electronic control unit may be configured to regard the driving load to be equal to or higher than the predetermined level by the vehicle reaching the at least one of the section with lane regulation and the section with traffic regulation, and set a section having the at least one of the section with lane regulation and the section with traffic regulation as a notification prohibition section that is a section in which the notification process is prohibited in the section setting process.

In the vehicle control device according to the aspect of the present disclosure, the accessory device may include at least one of a navigation system, an audio, and an air conditioning device.

In the vehicle control device according to the aspect of the present disclosure, the electronic control unit may be configured to execute a driving state information acquisition process of acquiring driving state information of the vehicle, and execute the notification process on condition that a logical product of a condition that the vehicle enters the notification available section, a condition that the user does not operate the accessory device, and a condition that a degree of deviation of actual traveling of the vehicle with respect to straight traveling and constant output traveling is equal to or smaller than a predetermined degree is true.

Since the level of the driving load increases during acceleration or deceleration driving or turning traveling of the vehicle, the notification is likely to cause the user to feel annoying. Therefore, in the aspect of the present disclosure, a condition that a degree of deviation of actual traveling of the vehicle with respect to straight traveling and constant output traveling is equal to or smaller than a predetermined degree is provided as the execution condition of the notification process.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
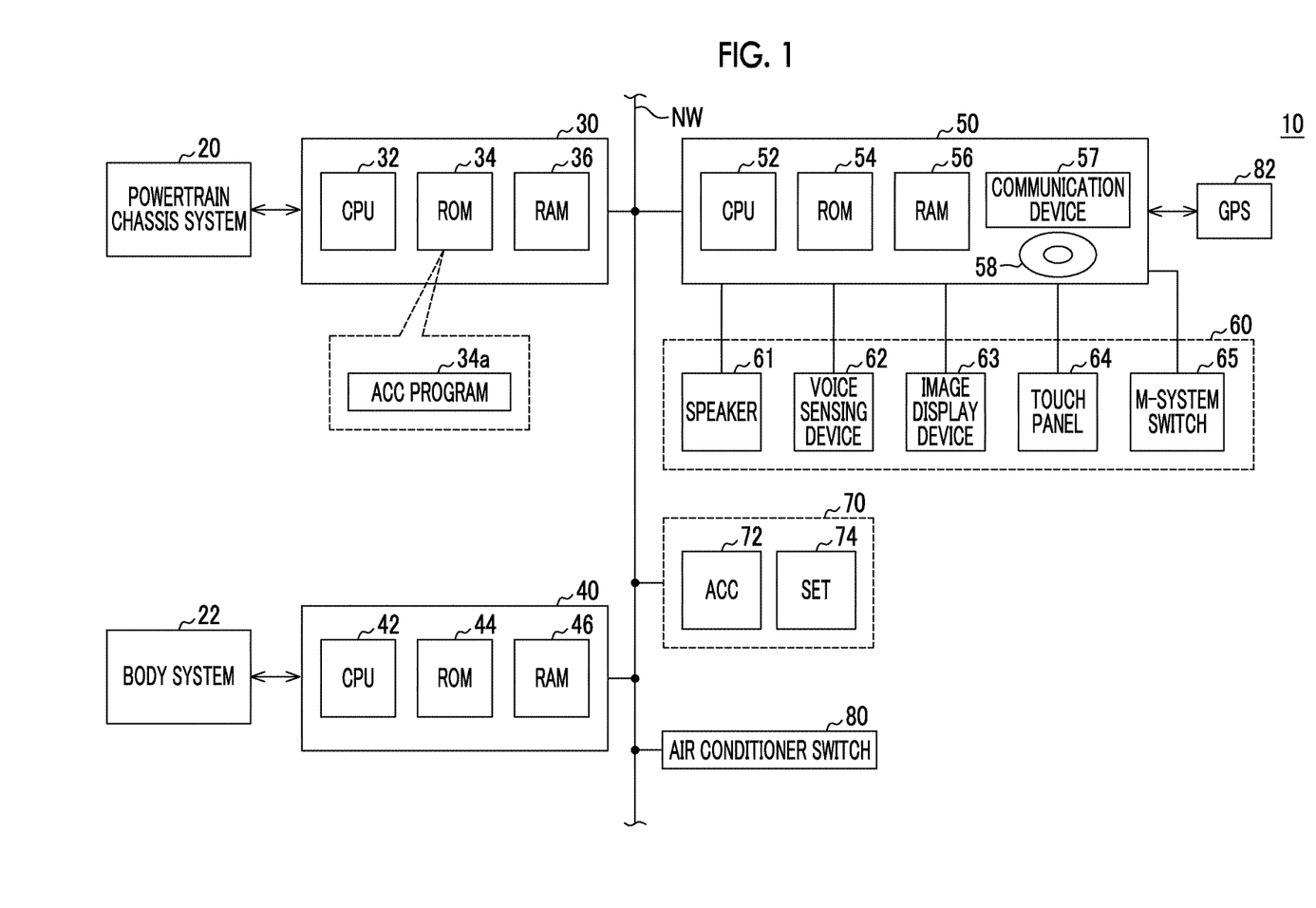
FIG. 1 is a diagram illustrating a device in a vehicle according to an embodiment.

Hereinafter, an embodiment of a vehicle control device will be described with reference to the drawings. FIG. 1 illustrates, particularly, a portion of an electronic device connected by a network NW in the vehicle 10.

A powertrain chassis system 20 includes, for example, an in-vehicle main device that applies power to a drive wheel, a steering actuator that steers a steered wheel, a brake actuator that applies a braking force to wheels, and some of various sensors that detect states of the actuator and the like. The electronic control unit (ECU 30) sets the powertrain chassis system 20 as a control target. For example, the ECU 30 controls an output of the in-vehicle main device, and operates a steering actuator to control a steering force for steering a steered wheel. The ECU 30 includes a CPU 32, a ROM 34, and a RAM 36.

A body system 22 includes an air conditioning device, a lighting device, a direction indicator, a door lock device, some of various sensors that detect a state of the device, and the like. The electronic control unit (ECU 40) sets the body system 22 as a control target. For example, the ECU 40 controls illuminance, an irradiation direction, and the like of the lighting device according to an instruction of a user. Further, for example, the ECU 40 determines whether or not the user is an authorized user based on an authenticated terminal carried by the user, and performs control to switch the lock device to a released state on condition that the user is the authorized user. The ECU 40 includes a CPU 42, a ROM 44, and a RAM 46.

A multimedia system 60 includes a speaker 61 that outputs voice, a voice sensing device 62 that converts vibration caused by the voice into an electrical signal, an image display device 63 such as a liquid crystal display device or an organic EL display device, a touch panel 64 arranged to overlap the image display device 63, and an M-system switch 65 that is a multimedia-system switch.

The electronic control unit (ECU 50) sets the multimedia system 60 as a control target. The ECU 50 includes a CPU 52, a ROM 54, a RAM 56, a communication device 57 that communicates with the outside, and a hard disk 58.

The ECUs 30, 40, 50 are connected to the network NW. A cruise switch 70 for instructing cruise control or an air conditioner switch 80 for instructing a set temperature or the amount of air of the air conditioning device is connected to the network NW. Here, the cruise switch 70 includes a system startup switch 72 for permitting execution of the cruise control for maintaining a constant inter-vehicle distance while the vehicle is traveling at a constant speed, and a set switch 74 for setting a vehicle speed when the vehicle travels at the constant speed as a current vehicle speed and actually starting up the cruise control.

Meanwhile, an ACC program 34a for executing the cruise control is stored in the ROM 34 of the ECU 30 of the powertrain chassis system 20. Here, the ACC program 34a is started up when the system startup switch 72 is turned on. When the set switch 74 is pressed, a vehicle speed at that time is stored, and the ACC program 34a causes the CPU 32 to execute control of maintaining a distance from a preceding vehicle while operating the in-vehicle main device in order to cause the vehicle 10 to travel at the stored vehicle speed. According to the ACC program 34a, the CPU 52 starts the cruise control by pressing the set switch 74 on condition that a current traveling speed of the vehicle 10 is equal to or higher than a lower cruise limit speed.

The vehicle 10 further includes a global positioning system (GPS 82). For example, when the user instructs audio reproduction by operating the M-system switch 65, the ECU 50 outputs an audio signal using the speaker 61. Further, for example, when the user instructs use of the navigation system by operating the M-system switch 65, the ECU 50 extracts map data in the vicinity of a current position from the map data stored in the hard disk 58 based on the position of the vehicle 10 detected by the GPS 82, and displays the map data on the image display device 63. The ECU 50 sequentially updates the map data to be displayed on the image display device 63 according to a change in the current position as the vehicle 10 travels. Further, the ECU 50 appropriately displays information on the vicinity of the current position of the vehicle 10 among the road information obtained from the outside via the communication device 57 on the image display device 63 or outputs the information as an audio signal via the speaker 61. The ECU 50 further executes a notification process of performing a notification to the user to encourage use of the cruise control. Hereinafter, this will be described.

Figure 2:
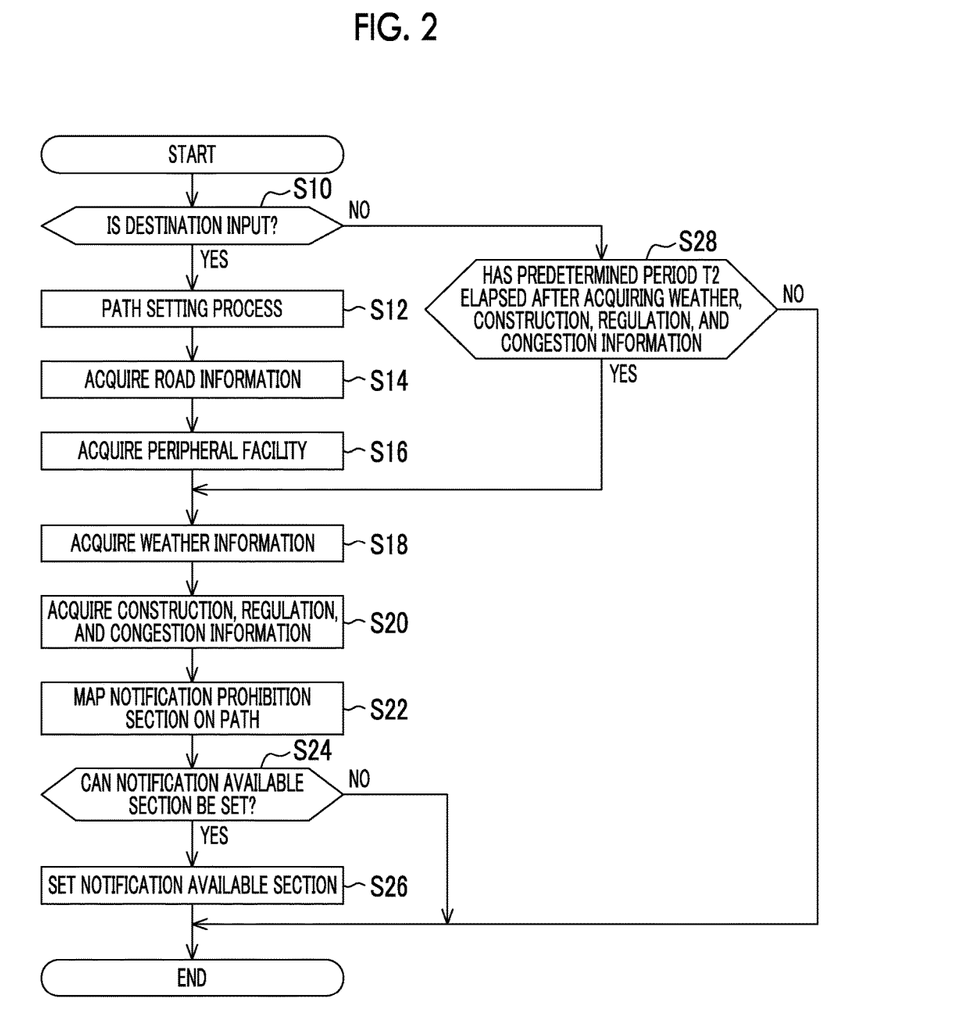
FIG. 2 is a flowchart illustrating a procedure of preprocessing for performing a notification process in an embodiment.

FIG. 2 illustrates a procedure of preprocessing for the notification process. The process illustrated in FIG. 2 is realized by the CPU 52 repeatedly executing a program stored in the ROM 54 at a predetermined period T1. Hereinafter, a step number is represented by a number beginning with "S".

In a series of processes illustrated in FIG. 2, the CPU 52 first determines whether or not the user has input a destination using a navigation system (S10). When the CPU 52 determines that the destination has been input (S10: YES), the CPU 52 sets a path from the current position to the destination (S12). In the process of S10, it is assumed that once a positive determination is made, the positive determination is not made until the destination is input again. In the path setting process, the CPU 52 sets a path according to an instruction of the user, for example, to first shorten a path length or to use a toll road, based on the map data. Then, the CPU 52 acquires road information on the set path based on the map data (S14). Here, the road information is information on a curve with a curvature equal to or greater than a predetermined value, a road having a gradient equal to or greater than a predetermined value, a width of a lane, a speed limit, a tunnel, a branch point, a merging point, and the like. Further, the CPU 52 acquires information on equipment near the path based on the map data (S16). Here, the facility information is information on a tollgate or the like.

Next, the CPU 52 accesses an information source outside the vehicle 10 using the communication device 57 and acquires, for example, probe traffic information or the like to acquire weather information in the vicinity of the path (S18). Next, the CPU 52 accesses the information source outside the vehicle 10 using the communication device 57, and acquires information on a section in which a construction is performed on the path, information on a section in which traffic is restricted, and congestion information (S20).

Then, the CPU 52 maps a section in which a driving load of the vehicle 10 is equal or greater than a predetermined level on the path, as a notification prohibition section that is a section in which the notification process is prohibited, based on the information acquired through the processes of S14 to S20 (S22). Hereinafter, this will be described in detail.

Based on the information acquired in the process of S14, the CPU 52 sets a section within a predetermined distance from a portion in which there is branching or merging on the path as the notification prohibition section. That is, when there is merging of lanes, it is needed to perform driving while paying attention to a vehicle entering the lane in which the vehicle 10 of the user is traveling from the other lane. Accordingly, the driving load becomes at a high level as compared with a case where there is no merging of lanes.

Further, when there is branching of the lane, the user drives while paying attention to changing the lane of a vehicle leaving the lane in which the vehicle 10 is traveling, or drives so that the vehicle 10 of the user itself changes the lane. Accordingly, the driving load becomes at a high level as compared with a case where there is no branching of lanes.

Figure 3A:
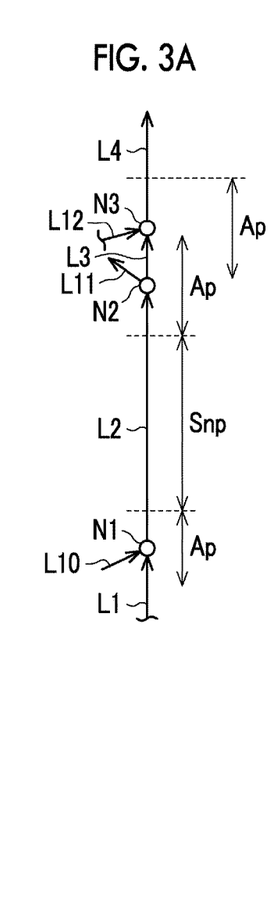
FIG. 3A is a diagram illustrating a mapping process of a notification prohibition section in the preprocessing.

FIG. 3A illustrates a process of mapping a section within a predetermined distance from a merging point and a section within a predetermined distance from a branch point as the notification prohibition section Ap. Map data constituting the path includes a directed graph, and in the example illustrated in FIG. 3A, a link L10 is connected to a node N1 which connects a link L1 to a link L2. Here, the link L1 and the link L2 constitute a set path up to the destination. In this case, the CPU 52 sets an area within a predetermined distance from an end point (node N1) of the link L1 in the links L1 and an area within a predetermined distance from a start point (node N1) of the link L2 in the link L2 as the notification prohibition section Ap. Further, in the example illustrated in FIG. 3A, a link L11 is connected to a node N2 that connects the link L2 and a link L3. Here, the link L11 indicates a branch road. In this case, the CPU 52 sets an area within a predetermined distance from an end point (node N2) of the link L2 in the links L2 and an area within a predetermined distance from a start point (node N2) of the link L3 in the link L3 as the notification prohibition section Ap. Similarly, the CPU 52 sets an area within a predetermined distance from an end point (node N3) of the link L3 in the link L3 and an area within a predetermined distance from a start point (node N3) of the link L4 in the link L4 as the notification prohibition section Ap.

Similarly, the CPU 52 regards the driving load to be at a high level in a section within a predetermined distance from a tollgate based on the information acquired in the process of S16, and sets the section as the notification prohibition section Ap. Further, the CPU 52 sets a section having a gradient equal to or greater than a predetermined value and a section having a curve with a curvature equal to or greater than a predetermined value as a notification prohibition section based on the information acquired in the process of S14. This considers that the driving load becomes at a high level when the vehicle travels on a road having a relatively great gradient as compared with a case where the vehicle travels on a flat road, and the driving load becomes at a high level when the vehicle travels on a road having a sharp curve as compared with a case where the vehicle travels straight.

Figure 3B:
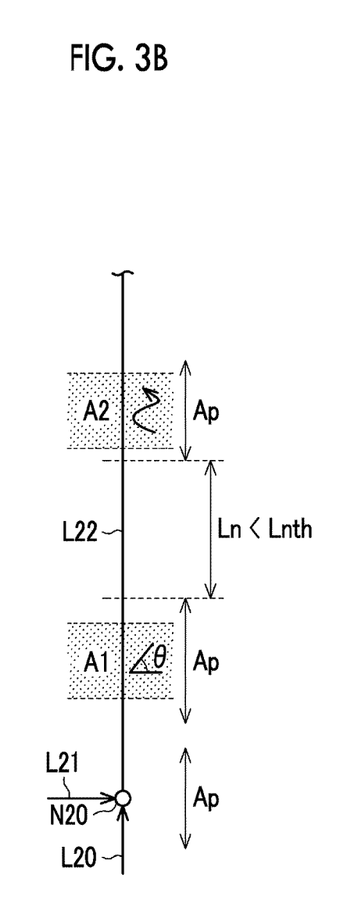
FIG. 3B is a diagram illustrating a mapping process of a notification prohibition section in the preprocessing.

FIG. 3B illustrates a process of mapping the section having the gradient equal to or greater than the predetermined value and the section having the curve with a curvature equal to or greater than the predetermined value as a notification prohibition section Ap. As illustrated in FIG. 3B, there are an area A1 having the gradient equal to or greater than the predetermined value and an area A2 having the curve with a curvature equal to or greater than the predetermined value in the middle of a link L22 in which a node N20 is a start point. In this case, the CPU 52 sets an area with a margin to some extent including the respective areas A1 and A2 as the notification prohibition section Ap. The notification prohibition section Ap is defined by a distance from the start point (node N20) of the link L22.

Similarly, the CPU 52 sets a section in which a width of the lane is small, a section with a slow speed limit, or a section with a tunnel as the notification prohibition section when the level of the driving load is high, based on the information acquired in the process of S14.

Further, the CPU 52 sets a section in which the amount of rain is equal to or larger than a predetermined amount as the notification prohibition section based on the information acquired in the process of S18. This considers that the driving load becomes at a high level, for example, since visibility is poorer than that in a section in which the amount of rain is small when the vehicle travels in the section in which the amount of rain is equal to or larger than a predetermined amount.

Figure 3C:
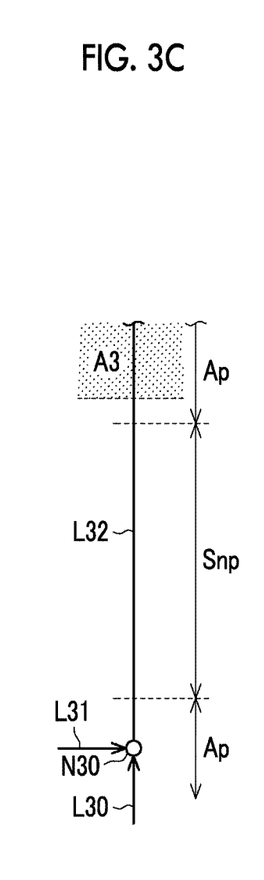
FIG. 3C is a diagram illustrating a mapping process of a notification prohibition section in the preprocessing.

FIG. 3C illustrates a process of mapping the section in which the amount of rain is equal to or larger than a predetermined amount as a notification prohibition section Ap. In FIG. 3C, an example in which there is an area A3 in which the amount of rain is equal to or larger than a predetermined amount in the middle of a link L32 of which a start point is a node N30 is illustrated. In this case, the CPU 52 sets a section including the area A3 with a margin to some extent as the notification prohibition section Ap. The notification prohibition section Ap is defined by a distance from the start point (node N30) of the link L32.

Similarly, the CPU 52 sets a section including an area in which wind blows with wind speed equal to or higher than a predetermined speed or a section including an area in which a snowfall is equal to or larger than a predetermined amount, as the notification prohibition section that is a section in which the level of driving load is high, based on the information acquired in the process of S18.

Further, the CPU 52 sets a section with lane regulation or traffic regulation as the notification prohibition section based on the information acquired in S20. This is a setting considering that the driving load becomes at a high level since the user tends to drive by paying attention to behavior of a forward vehicle in the section with the lane regulation or the traffic regulation as compared with a section without the lane regulation or the traffic regulation.

Figure 3D:
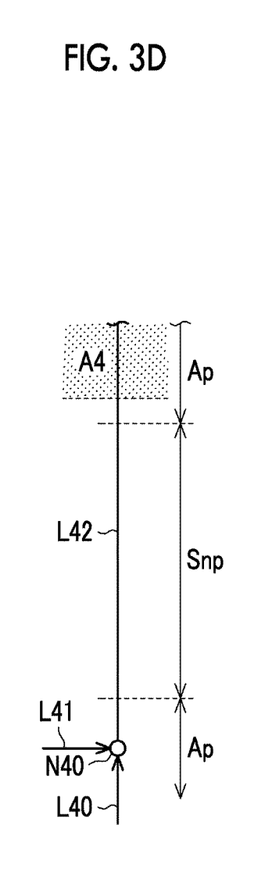
FIG. 3D is a diagram illustrating a mapping process of a notification prohibition section in the preprocessing.

FIG. 3D illustrates a process of mapping a section with lane regulation or traffic regulation as the notification prohibition section Ap. In FIG. 3D, an example in which there is an area A4 with lane regulation or traffic regulation in the middle of a link L42 of which a start point is a node N40 is illustrated. In this case, the CPU 52 sets a section with a margin to some extent including the area A4 as the notification prohibition section Ap. The notification prohibition section Ap is defined by a distance from the start point (node N40) of the link L42.

Similarly, the CPU 52 sets a section in which construction is performed or a congestion section as a notification prohibition section that is a section in which a level of a driving load is high based on the information acquired in S20. Referring back to FIG. 2, the CPU 52 determines whether or not the notification available section can be set based on the notification prohibition section (S24). Here, the notification available section is a section which is not the notification prohibition section and is a section in which a traveling distance is equal to or greater than a defined value Lnth. The defined value Lnth is set to a distance (for example, several kilometers or more) at which the user can experience benefit of the cruise control when the user uses the cruise control according to the notification.

That is, the CPU 52 sets a notification available section Snp in some paths illustrated in FIGS. 3A, 3C, and 3D, but does not set a section with a length Ln between the notification prohibition sections Ap illustrated in FIG. 3B as notification available section since the length Ln is smaller than the defined value Lnth.

Referring back to FIG. 2, when the CPU 52 determines that the notification available section can be set (S24: YES), the CPU 52 sets the notification available section based on a link ID and a distance from the start point of the link (S26).

On the other hand, when the CPU 52 makes a negative determination in S10, the CPU 52 determines whether or not a predetermined period T2 has elapsed after the information is acquired through the processes of S18 and S20 (S28). The process is intended to determine whether or not to update the mapping of the notification prohibition section by executing the processes of S18 and S20 again. Here, the predetermined period T2 is set as a time equal to or longer than an update period of information that is an acquisition target in a provider of the information through the processes of S18 and S20.

When the CPU 52 determines that the predetermined period T2 has elapsed (S28: YES), the CPU 52 returns to the process of S18. Meanwhile, when the CPU 52 makes a negative determination in the processes of S24 and S28 or when the CPU 52 completes the process of S26, the CPU 52 temporarily ends the series of processes illustrated in FIG. 2.

Figure 4:
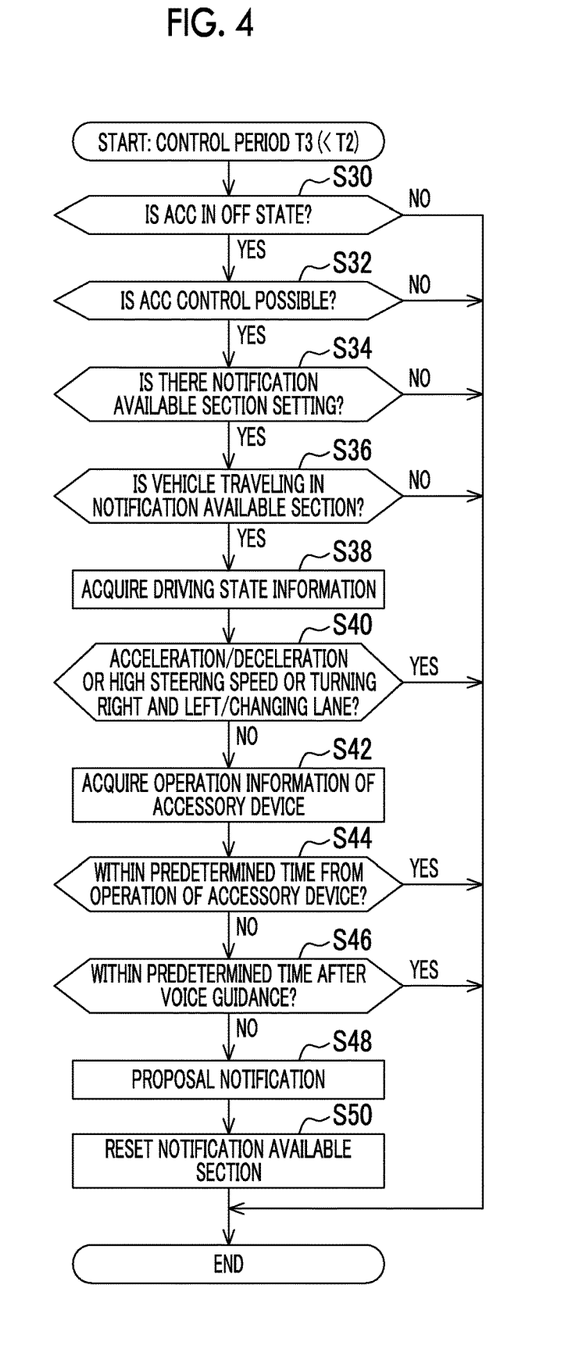
FIG. 4 is a flowchart illustrating a procedure of a process regarding execution of a notification process according to an embodiment.

FIG. 4 illustrates a procedure of a process regarding execution of the notification process. The process illustrated in FIG. 4 is realized by the CPU 52 repeatedly executing the program stored in the ROM 54 in a control period T3 shorter than the predetermined period T2.

In a series of processes illustrated in FIG. 4, the CPU 52 first determines whether or not the system startup switch 72 is in an OFF state (S30). The process is a process of confirming that the user does not use the cruise control. When the CPU 52 determines that the system startup switch 72 is in the OFF state (S30: YES), the CPU 52 determines whether or not the cruise control is possible (S32). Here, the CPU 52 determines, for example, whether or not a current speed of the vehicle 10 is equal to or higher than a lower cruise speed limit. When the CPU 52 determines that the cruise control is possible (S32: YES), the CPU 52 determines whether or not the notification available section is set through the process have been made in FIG. 2 (S34). When the CPU 52 determines that the notification available section is set (S34: YES), the CPU 52 determines whether or not the vehicle is traveling in the section set as the notification available section (S36).

When the CPU 52 determines that the vehicle is traveling in the notification available section (S36: YES), the CPU 52 acquires current driving state information of the vehicle 10 by the user (S38). That is, the CPU 52 acquires information on the amount of accelerator operation or the amount of brake operation, and a steering angle of the steering from the ECU 30 of the powertrain chassis system 20 over the network NW. Further, the CPU 52 acquires information on a state of the direction indicator from the ECU 30 of the body system 22 over the network NW.

The CPU 52 determines whether or not a logical sum of the vehicle being accelerated with a deceleration equal to or greater than a predetermined value or decelerated with a acceleration equal to or greater than a predetermined value, an absolute value of a change speed (steering speed) of a rotation angle (steering angle) of the steering being equal to or greater than a predetermine value, and the vehicle turning right or left or changing the lane is true (S40). Here, the CPU 52 determines whether the vehicle is accelerated with a acceleration equal to or greater than a predetermined value or decelerated with a deceleration equal to or greater than a predetermined value based on the amount of accelerator operation or the amount of brake operation. Further, the CPU 52 determines whether or not the steering speed is equal to or greater than a predetermined value based on a detection value of the steering angle. Further, the CPU 52 determines whether or not the user turns right or left or changes the lane based on a state of the direction indicator.

When the CPU 52 determines that the logical sum is false (S40: NO), the CPU 52 acquires information on a user operation of the accessory device (S42). Here, the accessory device is the multimedia system 60 or an air conditioning device of the body system 22, or the like. An example of the user operation of the accessory device includes an operation of the M-system switch 65 or an operation of the air conditioner switch 80.

The CPU 52 determines whether or not it is within a predetermined time from a user operation of the accessory device (S44). Here, the period within the predetermined time from the operation of the accessory device is assumed to include a period in which the user is operating the accessory device now. The process is intended to determine whether or not the period is not suitable for performing the notification process of recommending the cruise control. That is, for example, in a case where a notification for recommending the cruise control is performed when the user is operating the accessory device, the user is likely to feel annoying to the notification and attention to driving is likely to be obstructed.

When the CPU 52 determines that the operation of the accessory device is not performed or a certain time has elapsed after the accessory device has been operated (S44: NO), the CPU 52 determines whether or not it is within a predetermined time from voice guidance of the navigation system (S46). Here, a period in which the voice guidance is executed is included in a period within the predetermined time. The process is intended to determine whether or not the period is not suitable for execution of the notification process of recommending the cruise control. That is, when the notification process is executed during the voice guidance, the user is unlikely to recognize information on the voice guidance of the navigation, and when the notification process is executed immediately after the voice guidance, the user is likely to feel annoying to the notification.

When the CPU 52 determines that the voice guidance has not been performed or a predetermined time has elapsed after the execution of the voice guidance (S46: NO), the CPU 52 executes the notification process by outputting an audio signal to recommend the cruise control from the speaker 61 (S48). The CPU 52 resets the notification available section (S50).

Further, the CPU 52 temporarily ends the series of processes illustrated in FIG. 4 when the process of S50 is completed, when a negative determination is made in the processes of S30 to S36, and S40, or when a positive determination is made in the processes of S44 and S46.

An operation of the embodiment will be described herein. When the user performs a setting of the destination by operating the touch panel 64, the CPU 52 sets the notification available section of the cruise control as a section in which the driving load is not equal to or higher than a predetermined level based on path information up to the destination. The CPU 52 performs a notification to encourage the cruise control on condition that the system startup switch 72 is in an OFF state, the vehicle 10 is traveling in the notification available section, and the user does not operate the accessory device. Since the notification is performed when the vehicle is traveling in the section in which the driving load is not equal to or higher than the predetermined level based on the path information, and is also performed on condition that the user does not operate the accessory device, it is possible to suppress a situation that the user feels annoying to the notification.

According to the embodiment described above, the following effects are also obtained.

(1) The processes of S14 and S16 are executed solely once when the destination is input. Here, since it is needed to update the map data to be displayed on the image display device 63 according to the progress of the vehicle 10 when the vehicle 10 is traveling, and it is needed to appropriately provide a notification of the peripheral information of the road, a calculation load on the CPU 52 is higher than that when the vehicle 10 is stopped. Thus, by executing the processes of S14 and S16 solely when the destination is input, it is possible to reduce the calculation load on the CPU 52.

(2) The control period T3 in which the process of FIG. 4 is executed is shorter than the predetermined period T2 that is a period in which the processes of S18 and S20 are executed. Here, an update period of the information that is an acquisition target in the process of S18 and S20 is longer than a period of time in which the driving state of the vehicle 10 may be changed. Therefore, by setting the predetermined period T2 to be longer than the control period T3, it is possible to reduce the calculation load on the CPU 52 even while setting the notification available section with appropriate information.

(3) Using the CPU 52, the notification available section of the cruise control is set as a section having a length equal to or longer than the defined value Lnth. Thus, when the user operates the system startup switch 72 and the set switch 74 according to the notification to use the cruise control, a section in which the driving load is not equal to or higher than a predetermined level is continued for a while, and thus, it is possible to reduce elements from which the user is likely to feel anxiety with the start of use of the cruise control.

The ECU 30 in the embodiment functions as the driving support device, the process of S10 functions as the destination information acquisition process, the processes of S14 to S20 function as the path information acquisition process, and the processes of S22 to S26 function as the section setting process. The process of S38 functions as the operation state information acquisition process, and the process of S42 functions as the operation information acquisition process. The speaker 61 functions as the information providing device, and the process of S44 functions as the notification process. The ECU 50 functions as the vehicle control device.

Other Embodiments

Further, at least one of the matters of the embodiment may be modified as follows.

Setting Conditions of Notification Prohibition Section

The section in which the driving load is equal to or higher than a predetermined level is not limited to all the sections exemplified in the embodiments, and solely some of the exemplified sections may be adopted.

Further, position information of a parking area or a service area may be acquired as facility information and an area within a predetermined distance from the parking area or the service area may be set as the notification prohibition section. As the notification prohibition section, for example, a certain forward area in a traveling direction of the vehicle 10 in a section other than the notification prohibition section set in the manner of the embodiment may be further included in the notification prohibition section. That is, for example, sections exceeding a predetermined distance from a start point (node N1) of the link L2 in the notification available section Snp in FIG. 3A may all be notification prohibition sections. Thus, when the user uses the cruise control according to the notification process, a section in which the driving load is not equal to or higher than a predetermined level is continued for a while, and thus, it is possible to greatly reduce elements from which the user is likely to feel anxiety with the start of use of the cruise control.

Notification Available Section

In the embodiment, the notification available section is the section having a length equal to or greater than the defined value Lnth, and the defined value Lnth is the distance at which the convenience of the cruise control can be experienced, but the present disclosure is not limited thereto. For example, when the cruise control can also be executed on a traveling path at an end point of the notification available section, the cruise control can be used while the vehicle 10 is traveling over the distance at which the convenience of the cruise control can be experienced. This depends on conditions under which the cruise control is executable. Particularly, when the cruise control itself is executable in a section set as the notification prohibition section, a request for an increase in the defined value Lnth decreases as compared with a case where the cruise control is not executable. Similarly, for a lane keeping process, an automatic steering process, or a process of automatically switching a headlight of the vehicle to a low beam or a high beam that is a driving support process described in the following column "Driving support device", the defined value Lnth for determining a length of the section in which a notification for a request for the above-described process can be performed may be shortened.

Reset of Notification Available Section

In the embodiment, when the notification process is executed once, all the notification available sections set through the process of S26 are reset, but the present disclosure is not limited thereto. For example, when the user does not use the cruise control in the section after the notification process is performed, the notification process may be performed again on condition that the vehicle 10 enters another notification available section. However, the number of times the notification process is executed while the vehicle is traveling on a path to the destination is not limited to two times or less.

Execution Condition of Notification Process

In the embodiment, the system startup switch 72 being in an OFF state is included in the execution conditions of the notification process, but the present disclosure is not limited thereto. For example, the notification process may be performed on condition that a total distance by which the user has traveled without using the cruise control in the notification available section is equal to or greater than a predetermined value even though the system startup switch 72 is in an ON state.

Driving State Information

Information for detecting the acceleration and the deceleration of the vehicle 10 is not limited to the amount of accelerator operation and the amount of brake operation. For example, the information may be a change speed of a detection value of a vehicle speed sensor. When an absolute value of a yaw rate is equal to or greater than a predetermined value, a driving state may be determined not to be suitable for execution of the notification process, instead of determining whether or not the steering speed is equal to or greater than a predetermined value. As information that is used to determine the driving state not suitable for execution of the notification process, a yaw angle may be added. In this case, when an absolute value of the yaw angle is equal to or greater than a predetermined value, the driving state may be determined not to be suitable for execution of the notification process.

Operation of Accessory Device

In the embodiment, the operation of the air conditioning device, the operation of the audio, and the operation of the navigation system are exemplified as the operations of the accessory device in which the notification process is not performed, the present disclosure is not limited thereto, and solely at least one or solely two of the exemplified operations may be targets. Further, for example, an operation to instruct opening or closing of the window using a power window may be a target.

Driving Support Device

Although solely the vehicle speed being equal to or higher than the lower cruise speed has been described as the execution condition of the cruise control in the embodiment, a curvature being smaller than a defined value, for example, may be included. In this case, setting a section having a curve with the curvature equal to or greater than a predetermined value, or the like as the notification prohibition section aims at excluding a section in which the cruise control cannot can be executed, in addition to exclusion of a section in which the driving load is equal to or higher than a predetermined level.

The driving support device that executes driving support using a powertrain system based on an instruction for use or nonuse of a user is not limited to the cruise control. For example, a lane keeping assist process of executing a process of calling user's attention when the vehicle 10 straddles the lanes may be executed. Here, an example of the process of calling attention includes a process of generating a warning sound from the speaker 61, a process of displaying a warning on the image display device 63, or a process of applying vibration to the steering.

The lane keeping process is not limited to the process of calling user's attention when the vehicle 10 straddles the lanes. For example, the lane keeping process may be a process of operating the steering actuator and applying a force for keeping the vehicle in the lane independently from an operation of the steering to the steered wheel. For example, the curvature being smaller than a defined value may be included in the execution conditions of the lane keeping process. In this case, setting a section having a curve with the curvature equal to or greater than the predetermined value, or the like as the notification prohibition section aims at excluding a section in which the lane keeping process cannot be executed, in addition to exclusion of a section in which the driving load is equal to or higher than a predetermined level.

The driving support device that executes the driving support using the powertrain system based on the instruction for use or nonuse of the user is not limited to the cruise control or the lane keeping process. For example, an automatic steering process of automatically performing steering may be executed constantly in order to maintain the vehicle in the lane. For example, the curvature being smaller than a defined value may be included in the execution conditions of the automatic steering process. In this case, setting the section having a curve with the curvature equal to or greater than the predetermined value, or the like as the notification prohibition section aims at excluding a section in which the automatic steering process cannot be executed, in addition to exclusion of a section in which the driving load is equal to or higher than a predetermined level.

The driving support device that performs driving support based on an instruction for use or nonuse of the user is not limited to the driving support device using a powertrain system and, for example, may be a driving support device using the body system 22. An example of such a driving support device includes a driving support device that executes the process of automatically switching the headlight of the vehicle to the low beam or the high beam based on the output of the image sensing device that senses an image of a forward scene in the traveling direction of the vehicle.

Information Providing Device

The information providing device is not limited to the speaker 61 that outputs an audio signal. For example, the information providing device may be a head-up display. In this case, the notification process can be executed by projecting visual information such as text information indicating recommendation of use of the cruise control as a virtual image onto the front of the vehicle 10.

Vehicle Control Device

The present disclosure is not limited to including the CPU 52 and the ROM 54 and executing a software process. For example, a dedicated hardware circuit (for example, an ASIC) that performs a hardware process on at least some of software processes in the embodiment may be included. That is, the vehicle control device may have any one of the following configurations (a) to (c). (a) A processing device that executes all of the processes according to a program, and a program storage device that stores the program, such as a ROM, are included. (b) A processing device that executes some of the processes according to the program and a program storage device, and a dedicated hardware circuit that executes the remaining processes are included. (c) A dedicated hardware circuit that executes all of the processes is included. Here, there may be a plurality of software processing circuits including the processing device and the program storage device or a plurality of dedicated hardware circuits. That is, the process may be executed using a processing circuit including at least one of one or a plurality of software processing circuits and one or a plurality of dedicated hardware circuits.

The vehicle control device is not limited to a vehicle control device including a single electronic control unit. For example, the process in FIG. 2 is executed by an electronic control unit of a center outside the vehicle 10, and the CPU 52 may execute the processes of S34 and S36 in FIG. 4 as a query process toward the center. Further, a portable terminal of the user may execute the process of FIG. 2 in place of the center. This can be realized by installing an application program for executing the process of FIG. 2 in the portable terminal.

What is claimed is:

1. A vehicle control device that is applied to a vehicle including a driving support device configured to execute driving support based on an instruction for use or nonuse of a user, the vehicle control device comprising an electronic control unit configured to :

execute a destination information acquisition process of acquiring information on a destination of the vehicle, execute a path information acquisition process of acquiring path information that is information on a path from a current position of the vehicle to the destination, execute a section setting process of setting a section on the path from the current position of the vehicle to the destination as a notification available section on condition that a driving load in the section is not equal to or higher than a predetermined level based on the path information, execute an operation information acquisition process of acquiring information on presence or absence of a user operation of an accessory device that is an electronic device other than a powertrain system and a chassis system of the vehicle, and execute a notification process of performing a notification to request the user to operate an information providing device that provides information and use the driving support device on condition that a logical product of the vehicle entering the notification available section and the user not operating the accessory device is true when the user does not instruct to use the driving support device.

2. The vehicle control device according to claim 1, wherein an execution period of the path information acquisition process and the section setting process is longer than the execution period of the operation information acquisition process.

3. The vehicle control device according to claim 1, wherein:
the path information includes information on at least one of merging and branching of a lane; and
the electronic control unit is configured to set a section that includes neither the merging nor the branching as the notification available section in the section setting process.

4. The vehicle control device according to claim 3, wherein the electronic control unit is configured to regard the driving load to be equal to or higher than the predetermined level by the vehicle reaching the at least one of the merging and the branching, and set a section within a predetermined distance from a portion in which there is the at least one of the merging and the branching as a notification prohibition section that is a section in which the notification process is prohibited in the section setting process.

5. The vehicle control device according to claim 1, wherein:
the path information includes information on a section of at least one of a road having a gradient equal to or greater than a predetermined value and a road having a curve with a curvature equal to or greater than a predetermined value; and
the electronic control unit is configured to set a section that has neither the road having the gradient equal to or greater than the predetermined value nor the road having the curve with the curvature equal to or greater than the predetermined value as the notification available section in the section setting process.

6. The vehicle control device according to claim 5, wherein the electronic control unit is configured to regard the driving load to be equal to or higher than the predetermined level by the vehicle traveling on the at least one of the road having the gradient equal to or greater than the predetermined value and the road having the curve with the curvature equal to or greater than the predetermined value, and set a section that has the at least one of the road having the gradient equal to or greater than the predetermined value and the road having the curve with the curvature equal to or greater than the predetermined value as a notification prohibition section that is a section in which the notification process is prohibited in the section setting process.

7. The vehicle control device according to claim 1, wherein:
the path information includes information on a section in which an amount of rain is equal to or larger than a predetermined amount; and
the electronic control unit is configured to set a section in which the amount of rain is not equal to or larger than the predetermined amount as the notification available section in the section setting process.

8. The vehicle control device according to claim 7, wherein the electronic control unit is configured to regard the driving load to be equal to or higher than the predetermined level by the vehicle traveling in the section in which the amount of rain is equal to or larger than the predetermined amount, and set the section in which the amount of rain is equal to or larger than the predetermined amount as a notification prohibition section that is a section in which the notification process is prohibited in the section setting process.

9. The vehicle control device according to claim 1, wherein:
the path information includes information on at least one of a section with lane regulation and a section with traffic regulation; and
the electronic control unit is configured to set a section that has neither the section with lane regulation nor the section with traffic regulation as the notification available section in the section setting process.

10. The vehicle control device according to claim 9, wherein the electronic control unit is configured to regard the driving load to be equal to or higher than the predetermined level by the vehicle reaching the at least one of the section with lane regulation and the section with traffic regulation, and set a section having the at least one of the section with lane regulation and the section with traffic regulation as a notification prohibition section that is a section in which the notification process is prohibited in the section setting process.

11. The vehicle control device according to claim 1, wherein the accessory device includes at least one of a navigation system, an audio, and an air conditioning device.

12. The vehicle control device according to claim 1, wherein the electronic control unit is configured to execute a driving state information acquisition process of acquiring driving state information of the vehicle, and execute the notification process on condition that a logical product of a condition that the vehicle enters the notification available section, a condition that the user does not operate the accessory device, and a condition that a degree of deviation of actual traveling of the vehicle with respect to straight traveling and constant output traveling is equal to or smaller than a predetermined degree is true.

* * * * *